Dec. 3, 1957 ISOKAZU TANAKA ET AL 2,815,506
GONIOMETER AND THE LIKE
Filed May 13, 1953

United States Patent Office 2,815,506
Patented Dec. 3, 1957

2,815,506

GONIOMETER AND THE LIKE

Isokazu Tanaka and Mitsuo Goto, Tokyo-to, Japan

Application May 13, 1953, Serial No. 354,852

Claims priority, application Japan May 31, 1952

5 Claims. (Cl. 343—124)

This invention relates to an improved goniometer suitable for a wireless direction-finder and the like.

Generally, it has been desired that the mutual inductance, that is, coupling coefficient of the goniometer to be used for a wireless direction-finder, should be as large as possible and the coupling error thereof should be as little as possible.

In the former goniometers, however, mutual inductance and stray capacitance between adjacent coils in the rotor winding are relatively large due to the fact that coils of said windings are wound crosswise of each other on a cylindrical or disk-shaped iron core, so that they are apt to result in diminution of their efficiency and exceptional errors particularly in high frequency range. Moreover, due to the use of a revolving shaft, arrangement of the windings is apt to become unbalanced resulting in the occurrence of error.

It is, therefore, an object of this invention to provide an improved goniometer and the like obviating the defects described above and simple to structure and easy in manufacture.

Said object and other objects of this invention have been accomplished by adopting a stator composed of a circular ring shaped iron core and an endless winding wound on said core, and a rotor composed of circular ring shaped iron core and an endless winding wound on said core, one of said windings being wound on the core with sine or approximately sine distribution, and the other being wound uniformly on the core.

This invention will be more clearly understood by reference to the following detailed description taken in connection with the examples illustrated in the accompanying drawings, wherein.

Figure 1:
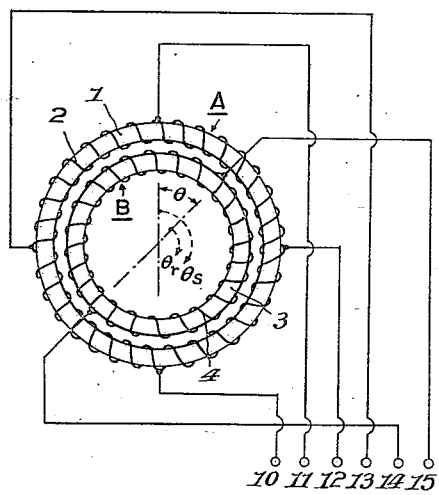
Fig. 1 is a diagrammatic front view of a goniometer being inferior to that illustrated in Figs. 2 and 3.
Figure 1A:
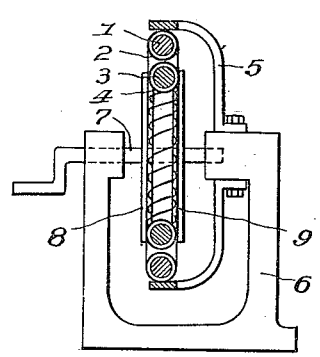
Fig. 1a is a partly sectioned actual side view of the example illustrated in Fig. 1.

Referring to the example illustrated in Figs. 1 and 1a, the stator A consists of a circular ring shaped iron core 1 having circular, rectangular, elliptic or other uniform cross-section and made of a material suitable for high frequency, for example, dust core, and an endless winding 2 wound with uniform distribution on said core 1. The rotor B consists of an iron core 3 and an endless winding 4 wound on said core, said core and winding being constructed and wound in the same manner as the core 1 and winding 2. The stator A is supported stationarily by several arms 5 attached to a fixed supporter 6 and the rotor B is supported rotatably in said stator A by suitable means, for example, by holding it between two disks 8 and 9 having a revolving shaft 7. For the purpose of concentric support of the stator and the rotor any other means may be adopted.

It is desirable to arrange the stator A and the rotor B in the same plane in order to enlarge the coupling coefficient, but under certain circumstances it may be allowable to arrange them in different planes.

The stator winding 2 is provided with four input terminals 10, 11, 12 and 13, two of them being connected with two points on a diametrical vertical-line of said winding and the other two being connected with two points on a diametrical horizontal-line of said winding. On the other hand, the rotor winding 4 is provided with two output terminals 14 and 15 connected with two points on a diametrical line of said winding. The angle $\theta$ between the line passing through said two points connected with the terminals 14 and 15 and other vertical line passing through said two points connected with the terminals 10 and 11 will be explained simply as "revolving angle" in the following description.

Referring to the goniometer illustrated in Fig. 1, when the terminals 10, 11 of a pair are connected with one element of a cross type loop antenna or Adcock type antenna (not shown) and the terminals 12, 13 of the other pair are connected with another element of said antenna, magnetic flux of high frequency will be induced in the iron cores 1 and 3 resulting in induction of a detecting voltage in the rotor winding 4 at the terminals 14 and 15 thereof.

If necessary, however, the goniometer illustrated in Fig. 1 may be combined with an antenna of other type such as the one consisting of many of symmetrical elements more than two and connected with the symmetrical points of the stator winding 2. In this case a goniometer less in error than the former will be obtained.

According to the structure illustrated in Fig. 1, the greatest part of induced magnetic flux passes through the iron cores 1 and 3 of large magnetic permeability and there are only very narrow air-gaps in the path of said flux, so that the mutual inductance between the stator winding 2 and the rotor winding 4 becomes very large. Due to circular ring form of the stator and rotor and endless form of said windings 2 and 4, the goniometer is of a very simple structure. Furthermore, due to balanced concentric arrangement of the stator and the rotor windings, efficiency becomes very large and error will be decreased remarkably.

The mutual inductance $M(\theta)$ between the stator winding and the rotor winding in the goniometer illustrated in Fig. 1 may be represented by following Equation 1, wherein $\theta$ is the revolving angle, $N_s$ and $N_r$ are respectively the total number of turns of the windings 2 and 4 and each of $A_1, A_2, A_3 \ldots$ represents constant coefficient to be decided by electric and magnetic properties of the cores 1, 3 and windings 2, 4 as well as by their configurations.

$$M(\theta) = 0.81 \ N_s N_r (A_1 \cos \theta + A_2 \cos 3\theta + A_3 \cos 5\theta + \ldots \quad A_1 \gg A_2 > A_3 \ldots \quad (1)$$

Figure 2:
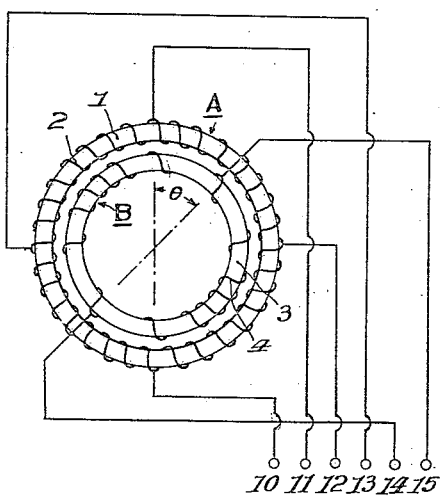
Fig. 2 is a diagrammatic front view of another example of this invention.

As will be clear from the factor $(A_2 \cos 3\theta + A_3 \cos 5\theta + \ldots)$ in the Equation 1, an error which has been known as "octantal error" would occur in the same of the goniometer illustrated in Fig. 1. According to the present invention, this error can be effectively eliminated by winding any one of the stator and rotor windings with sine or nearly sine distribution as shown in Fig. 2, wherein the same numerals as those illustrating the same parts shown in Fig. 1, denote the same parts herein. The example illustrated in Fig. 2 is almost the same as the one in Fig. 1 except that only the stator winding 2 is wound with uniform distribution on the stator core 1, but the rotor winding 4 is wound with sine or nearly sine distribution on the rotor core 3.

In the example illustrated in Fig. 2, the mutual inductance $M'(\theta)$ between the windings 2 and 4 becomes as follows:

$$M'(\theta) = A_1 N_s N_r \cos \theta \quad (2)$$

wherein $\theta$ is the revolving angle and $A_1$, $N_s$ and $N_r$ are the same coefficients as those in the Equation 1. As will be clear from the Equation 2, the error due to "octantal error" will be effectively eliminated and also the coupling coefficient will become larger.

Above Equations 1 and 2 may be theoretically justified as follows.

When the magnetic flux induced in the rotor core due to the current in the stator winding of uniform distribution is taken as $\Phi(\theta_s)$, it may be indicated by following equation.

$$\Phi(\theta_s) = N_s \sum_{m=0}^{\infty} \varphi_m \text{ sine } (2m+1)\theta_s \qquad (3)$$

In the Equation 3, $\varphi_m$ is a constant, $N_s$ is number of turns of the stator winding and $\theta_s$ is an angle taken from the line connecting both points connected with the terminals 10, 11 as indicated in Fig. 1.

Variation of the mutual inductance $M(\theta)$ due to rotation of rotor is proportionate to the total magnetic flux crossing the rotor winding, so that $M(\theta)$ may be indicated by following Equation 4, wherein $(\theta_r)$ is an angle taken from the line connecting both points connected with the terminals 14 and 15, $(n\theta_r)d\theta_r$ is the number of turns of the rotor winding per infinitesimal angle $d\theta_r$, and the transformation of the variable from $(\theta_r)$ to $(\theta_s)$ is justified from the relation $(\theta_r = \theta_s - \theta)$ as seen in Fig. 1.

$$M(\theta) \alpha \int_0^{\pi} \Phi(\Theta_s) n(\Theta_r) d\theta_r = \int_0^{\theta+\pi} \Phi \Theta_s) n(\Theta_s - \Theta) d\Theta_s \qquad (4)$$

When the rotor winding is wound with uniform distribution, the factor $n(\theta_r)$ becomes as follows.

$$n(\theta_r) = \frac{N_r}{2\pi} \qquad (5)$$

In the Equation 5, $N_r$ is number of turns of the rotor winding.

On the other hand, when the rotor winding is wound with sine distribution, it becomes as follows.

$$n(\theta_r) = \frac{N_r}{4} \sin \theta_r \qquad (6)$$

The Equation 1 may be derived from the Equations 3, 4, 5 and the Equation 2 may be derived from the Equations 3, 4, 6, said deriving calculation being omitted for the purpose of simplification of this specification.

Figure 3:
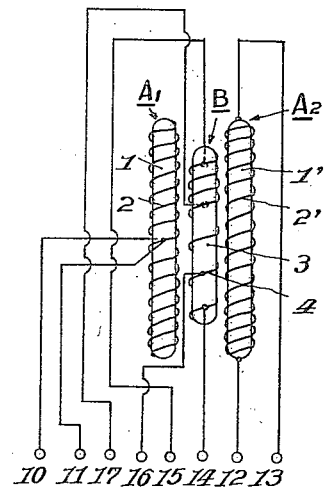
Fig. 3 is a diagrammatic side view of a further example of this invention.

Referring to the example illustrated in Fig. 3, the stator consists of two stators $A_1$ and $A_2$, the former thereof being composed of an iron core 1 suitable for high frequency and a winding wound with uniform distribution on said core 1 and the latter being composed of an iron core 1' and a winding 2' wound with uniform distribution on said core 1'. Two pairs of input terminals 10, 11 and 12, 13 are led from the stator windings 2 and 2', the terminals of the former pair being connected with two points on a diametrical horizontal-line of said winding 2 and the terminals of the latter pair being connected with two points on the diametrical vertical-line of said winding 2'. The rotor B supported rotatably between said stators $A_1$ and $A_2$ consists of an iron core 3 and a winding 4 wound with sine distribution on said core, from two diametrical points of said winding being led to main output terminals 14, 15.

The operation of the example illustrated in Fig. 3 is similar to that of the example illustrated in Figs. 1 and 1a.

The example illustrated in Fig. 3 may be modified, with same excellent result, in such a manner that the stator windings 2 and 2' are wound with sine or nearly sine distribution and the rotor winding 4 is wound with uniform distribution. Moreover, rotor diameter may be larger than that of the stators.

Furthermore, in the example illustrated in Fig. 3 auxiliary output terminals 16 and 17 are led from the points displaced about 90° against two points connected with the main terminals 14 and 15 of the rotor winding 4 so that there may be a phase difference of 90° between the output voltage induced in the terminals 16, 17 and the output voltage induced in the terminals 14, 15. When said voltage between the terminals 16 and 17 is superposed on the voltage induced in a vertical antenna, an accurate detection of single direction would be obtained.

In the embodiment of this invention, windings may be wound in the slots made on their cores. According to such structure, it is possible to decrease the air-gaps between the stator and the rotor as little as possible whereby coupling coefficient will be greatly increased.

As clear from the above description in connection with the various examples, the goniometer of this invention has various merits that coupling coefficient is very large, measurement is very accurate, and structure and manufacture are very simple.

Furthermore, when an alternating current or a direct current superposed with an alternating current is fed in the rotor winding of the goniometer of this invention, it is possible to lead poly-phase current out of several symmetrical pairs of terminals in the stator winding, for example, to lead two-phase current out of the vertical pair and horizontal pair of terminals in the stator winding.

Since it is obvious that many changes and modifications can be made in the above described details without departing from the nature and spirit of this invention, it is to be understood that this invention is not restricted within said description.

Having thus described our invention, we claim:

1. A goniometer and the like comprising a stator composed of a circular ring-shaped iron core and an endless winding wound on said core, and a rotor composed of circular ring-shaped iron core, and an endless winding wound on said core, one of said windings being wound on the core thereof with substantially sine distribution and the other being wound uniformly on the core thereof.

2. A goniometer and the like, which comprises a stator composed of a circular ring-shaped iron core and a uniformly distributed endless winding wound toroidally on said core and a rotor composed of a circular ring-shaped iron core and an endless winding wound toroidally on said core with substantially sine distribution.

3. Goniometer and the like which comprises two like stators arranged coaxially side by side, each of said stators being composed of a circular ring-shaped iron core and a uniformly distributed endless winding on said core, and a rotor arranged symmetrically between said stators and composed of a circular ring-shaped iron core and an endless winding wound toroidally on said core with substantially sine distribution.

4. Goniometer and the like, which comprises two similar stators arranged coaxially side by side, each of said stators comprising a circular ring-shaped iron core and an endless winding wound toroidally on said core with substantially sine distribution, and a rotor arranged symmetrically between said stators and composed of a circular ring-shaped iron core and a uniformly distributed endless winding wound toroidally on said core.

5. Goniometer type poly-phase alternating current generator which comprises a stator composed of circular ring-shaped iron core and an endless winding wound on said core, a rotor composed of a circular ring-shaped iron and an endless winding wound on said core, one of said windings being wound on its core with substantially sine distribution and the other being wound uniformly on its core, means for feeding an alternating current to said rotor winding, and symmetrically disposed output terminals for poly-phase current on said stator winding.

References Cited in the file of this patent

FOREIGN PATENTS

| | | |
|---|---|---|
| 195,088 | Great Britain | May 15, 1924 |
| 51,645 | France | Dec. 10, 1942 |
| 894,379 | France | Mar. 13, 1944 |